United States Patent [19]
Chitty et al.

[11] Patent Number: 5,669,637
[45] Date of Patent: Sep. 23, 1997

[54] MINIATURE FITTING ASSEMBLY FOR MICRO-TUBING

[75] Inventors: Andrew L. Chitty, West Linn; John T. Martin; Saleh Mohammed Mirani, both of Portland, all of Oreg.

[73] Assignee: Optimize technologies, Inc., Oregon City, Oreg.

[21] Appl. No.: 655,440

[22] Filed: May 29, 1996

[51] Int. Cl.⁶ .................... F16L 19/06; F16L 21/04
[52] U.S. Cl. .................................. 285/342; 285/348
[58] Field of Search .......................... 285/341, 342, 285/348, 423

[56] References Cited

U.S. PATENT DOCUMENTS

| Re. 21,603 | 10/1940 | Guarnaschelli . | |
|---|---|---|---|
| 193,993 | 8/1877 | Pennie . | |
| 359,500 | 3/1887 | Davis . | |
| 731,348 | 6/1903 | Eshelman . | |
| 826,018 | 7/1906 | Concoff . | |
| 2,077,035 | 4/1937 | Bredeson . | |
| 2,387,660 | 10/1945 | Hall et al. . | |
| 2,470,546 | 5/1949 | Carlson . | |
| 2,523,874 | 9/1950 | Moore . | |
| 3,186,743 | 6/1965 | Russell . | |
| 3,545,794 | 12/1970 | Wise et al. ................ | 285/348 X |
| 3,582,115 | 6/1971 | Clague ........................ | 285/341 |
| 3,756,632 | 9/1973 | Riggs et al. . | |
| 4,183,560 | 1/1980 | Wyss ........................... | 285/348 X |
| 4,529,231 | 7/1985 | Greenawalt ................ | 285/342 |
| 4,556,242 | 12/1985 | Kowal et al. ............... | 285/341 |
| 4,621,843 | 11/1986 | Straub ........................ | 285/356 |
| 4,776,618 | 10/1988 | Barree ........................ | 285/341 |
| 4,865,363 | 9/1989 | Takahashi ................... | 285/323 |
| 5,088,773 | 2/1992 | Gralenski ................... | 285/52 |
| 5,217,261 | 6/1993 | DeWitt et al. .............. | 285/332.2 |

FOREIGN PATENT DOCUMENTS

| 511460 | 11/1992 | European Pat. Off. ......... | 285/341 |
|---|---|---|---|
| 880495 | 10/1961 | United Kingdom ............. | 285/342 |

OTHER PUBLICATIONS

"Miniature connectors, Fittings, & Tubing" from General Valve Corp. catalog, Mar. 1994.

*Primary Examiner*—John A. Ricci
*Attorney, Agent, or Firm*—Christensen O'Connor Johnson and Kindness PLLC

[57] ABSTRACT

A fitting assembly (10) mates an end of polymer micro-tubing (12) in fluid communication with an internally threaded connector (22) having an internal bottom wall (38). The fitting assembly includes a male nut (16) having external threads and a passage for receiving the end of the polymer micro-tubing. The fitting assembly additionally includes an insert (24) having an elongated stem (30) and an annular head (26). The stem projects from the rear side of the annular head for insertion into the end of the polymer micro-tubing. The annular head includes a forwardly projecting nose section (31). An elastomeric seal (40) is received on the nose section (31) and retained in place by a lip (33) included on the nose section. The seal is compressed between the head of the insert and the bottom wall of the connector. A ferrule (32) captured on the micro-tubing between the nut and the head of the insert compresses the tubing between the ferrule and the stem, and transmits force longitudinally to the head of the insert to compress the seal.

30 Claims, 3 Drawing Sheets

MINIATURE FITTING ASSEMBLY FOR MICRO-TUBING

FIELD OF THE INVENTION

The present invention relates generally to couplings for tubes, and more particularly to couplings for soft polymer micro-tubing frequently used in the analytical chemistry and biomedical fields.

BACKGROUND OF THE INVENTION

The analytical chemistry and biomedical fields frequently require analyzing very small fluid samples. To make maximum use of the small amount of fluid available, personnel typically convey the fluid through small diameter polymer tubing, called micro-tubing, to equipment capable of accurately analyzing small fluid samples. Micro-tubing generally has nominal inside diameters ranging from ¼ to 1/32 inch, or smaller.

Polymer micro-tubing has several advantages over tubing composed of other materials, such as metals or elastomers. Polymer micro-tubing is typically formed from a highly inert polymer that is chemically non-reactive with and highly insoluble in most substances. For example, Teflon® polytetrafluorethylene or fluorinated ethylenepropylene is often used for laboratory micro-tubing. Chemically reactive fluid samples, such as reagents or solvents, can thus generally be conveyed through polymer tubing without damaging the tubing, and more importantly, without contaminating the fluid sample. Metals and elastomers tend to be more chemically reactive and/or soluble, i.e. less resistant to chemically reactive fluids. Metal or elastomeric tubing therefore usually increases the risk of contaminating a fluid sample conveyed through the tubing.

While polymer micro-tubing has several advantages in the analytical chemistry and biomedical fields, it also has a disadvantage. Namely, polymer micro-tubing is difficult to satisfactorily connect to other components or tubing. The small liquid or gas samples analyzed in these fields require leak-proof connections to a degree not required in other fields. The small samples usually require connections that minimize dead volume and restriction, and in some cases, connections that minimize the amount of turbulent flow introduced through the connection.

Polymer tubing tends to be soft and collapsible and has low-friction properties. Conventional "bite-type" compression fittings apply pressure only around the outside circumference of tubing, which can collapse thin-walled polymer micro-tubing. Conventional bite-type fittings thus require thick-walled micro-tubing, which is more costly and less flexible. Conventional bite-type fittings can also introduce leaks, especially in pressure applications, and produce areas of turbulent (i.e., nonlinear) flow in and around the connection.

One attempted solution to the problem of connecting polymer micro-tubing to other components or tubing, employs a sealing disk formed from a fluorinated polymer such as Teflon® or Kalrez® fluoropolymers. Elastomeric materials are not used to form the disk because elastomers tend to be more chemically reactive and/or soluble as discussed above. In use, the sealing disk is compressed between a fitting and a mating connector, wherein the fitting receives an end of the polymer micro-tubing. The compression force "sandwiches" the sealing disk between the fitting and the connector, which tends to form a seal between these three items. Over time, these polymers may cold-flow, permanently deforming under the compressive force and, thus, loosening and potentially permitting leakage.

The present invention provides an improved solution for the problem of connecting polymer micro-tubing to other components or tubing.

SUMMARY OF THE INVENTION

The present invention provides a fitting assembly for mating an end of a polymer micro-tubing segment in fluid communication to a connector having internal threads and an internal wall disposed orthogonal to the fluid path. The fitting assembly includes a male nut having external threads dimensioned for threadable coupling with the internal threads of the connector. A passage is defined axially through the nut for receiving the end of the micro-tubing segment. The fitting assembly also includes an insert which includes an elongated tubular stem having opposites ends, and an annular head extending coaxially from one end of the stem. The other end of the stem is insertable within the received end of the polymer micro-tubing segment so that the head of the insert abuts an end edge of the received end of the polymer micro-tubing and the internal wall of the connector. An annular elastomeric seal is received coaxially in sealing contact with the annular head of the insert and in sealing contact with the internal wall of the connector when the fitting assembly is mated to the connector. An annular ferrule is received coaxially on the received end of the micro-tubing segment and is captured between the annular head of the insert and the nut, so that the nut causes compression of the elastomeric seal when the assembly is mated to the connector.

In a further aspect of the invention, the annular elastomeric seal is received coaxially on the head of the insert to extend distally beyond a distal side of the head of the insert, towards a bottom portion of the internal wall of the connector. The nut bears on the ferrule when the fitting assembly is mated with the connector to compressively seal the received end of the micro-tubing segment between the ferrule and the stem of the insert. The elastomeric seal is further compressed in sealing engagement with the head of the insert and the bottom portion of the wall of the connector.

In a first preferred embodiment, the annular head includes a nose section projecting from the side of the annular head opposite the stem. The nose section receives, and is coaxially surrounded by the annular seal. In an alternate embodiment of the invention, the annular seal is received within an annular groove formed axially on the distal side of the head of the insert. In each embodiment of the present invention, the head of the fitting assembly insert abuts the orthogonal bottom wall of the mating connector upon coupling and compression of the seal. This abutment ensures a zero-dead-volume connection, which is required for chemical analytical instrument applications to prevent pockets of reduced fluid flow and mixing that would reduce the accuracy of the analysis results.

In other alternate embodiment of the invention, the head of the insert forms an annular circumferential flange between the distal side of the insert and the tubular stem. The elastomeric seal surrounds the outer circumference of the head, wrapping the flange of the head. A first shoulder of the elastomeric seal contacts an exterior wall of the received end of the micro-tubing segment. A second shoulder of the elastomeric seal extends distally beyond the distal end of the head of the insert. The ferrule includes an annular flange that extends distally to surround an exterior surface portion of the elastomeric seal. The ferrule bears against the elastomeric seal when the fitting assembly is connected to the connector, with the insert being isolated from the ferrule by the elastomeric seal.

3

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a perspective view of an alternate embodiment of a fitting assembly in accordance with the present invention, connected to a length of polymer micro-tubing;

FIG. 4 illustrates a cross-sectional view of the fitting assembly and tubing of FIG. 3 threadably mated to a connector, taken through the longitudinal axis of the fitting assembly;

DETAILED DESCRIPTION OF THE PREFERRED AND ALTERNATE EMBODIMENTS

Figure 1:
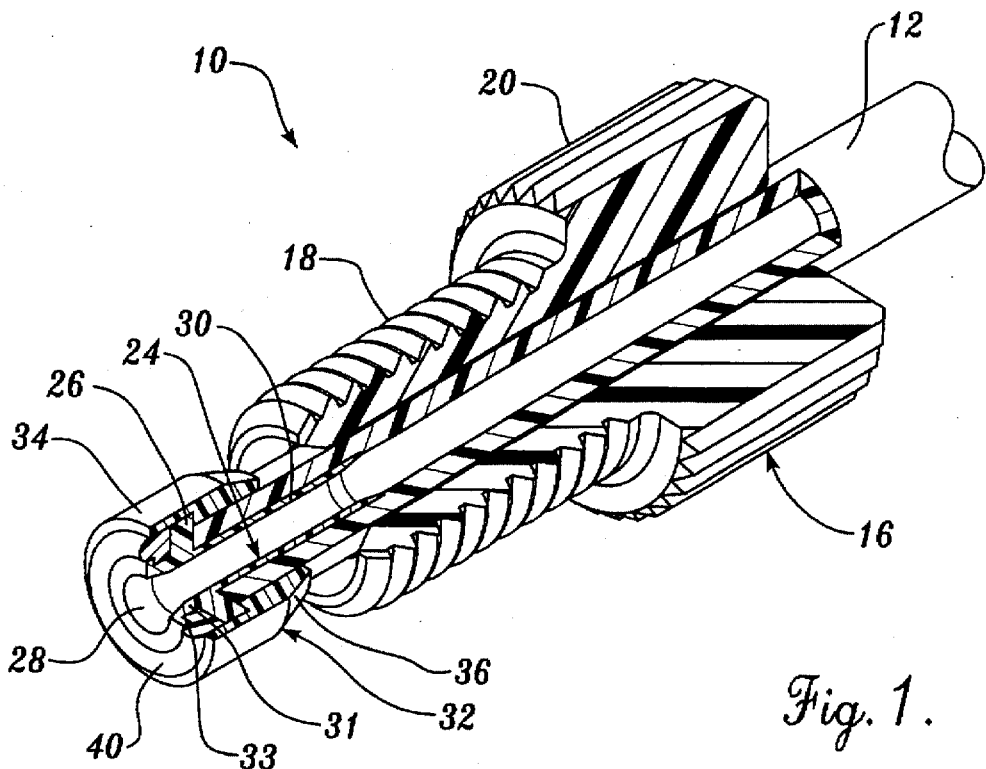
FIG. 1 illustrates a cut-away perspective view of a preferred embodiment of a fitting assembly in accordance with the present invention, connected to a length of polymer micro-tubing.

FIG. 1 illustrates a first preferred embodiment of a fitting assembly 10 in accordance with the present invention. The fitting assembly 10 mounts on the end of a length of polymer micro-tubing 12 for mating the end of the tubing to a connector in a leak-proof manner.

Figure 2:
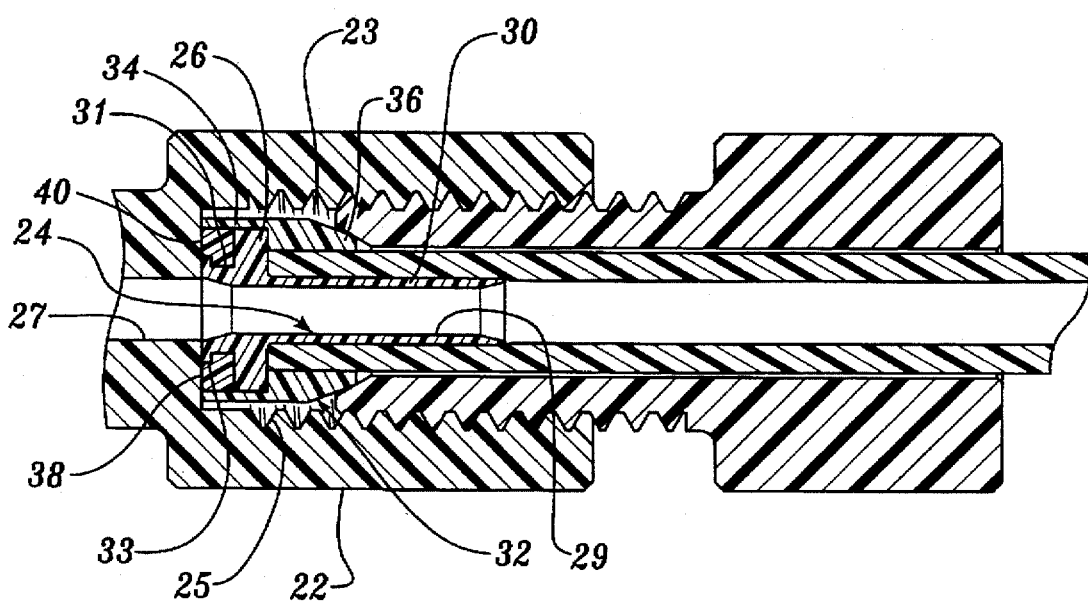
FIG. 2 illustrates a cross-sectional view of the fitting assembly and tubing of FIG. 1 threadably mated to a connector, taken through the longitudinal axis of the fitting assembly.
Figure 1:
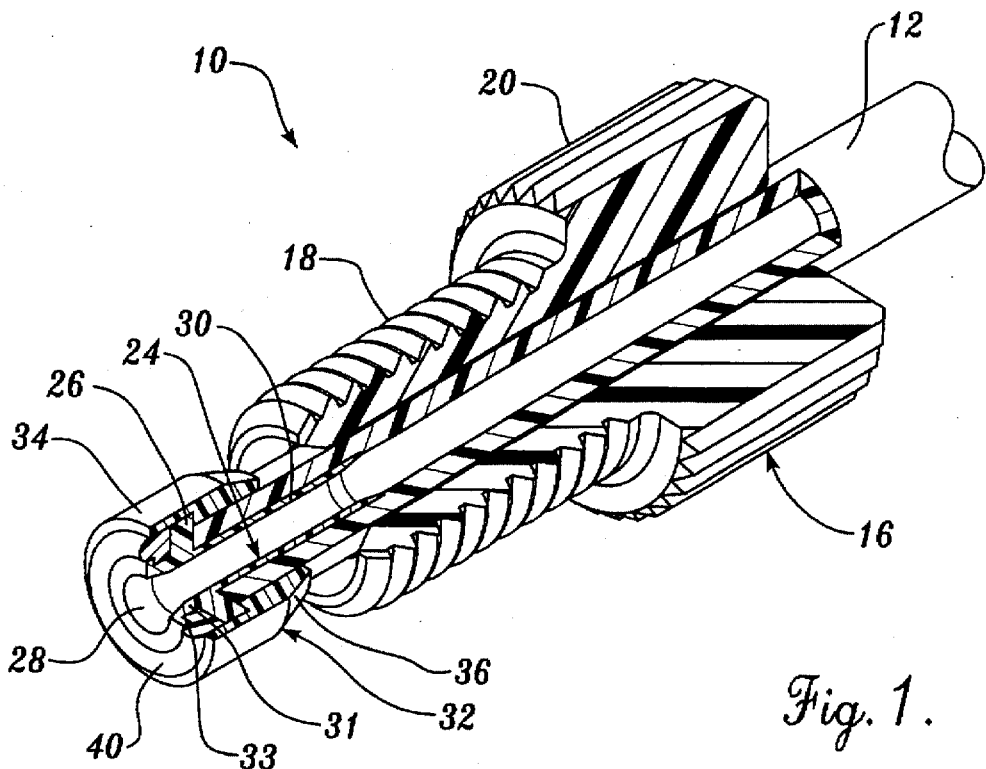
Figure 2:
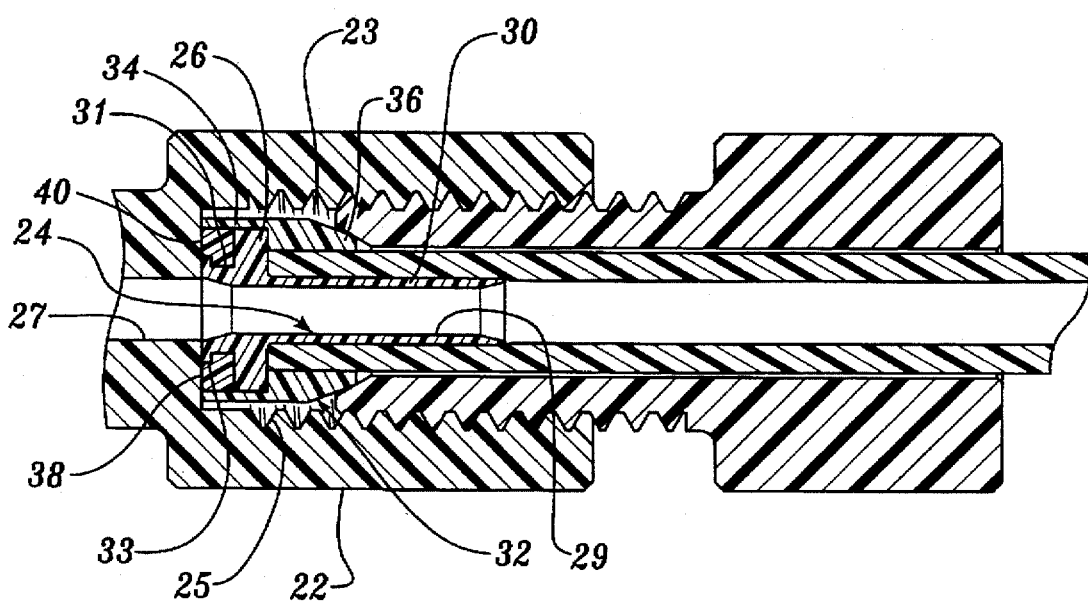

The fitting assembly 10 includes a male nut 16 having two cylindrical sections 18 and 20 of different diameters. The smaller diameter or nose section 18 projects coaxially from the forward end of the larger section 20. The nose section 18 includes an interlocking surface in the form of external threads dimensioned to engage with an interlocking surface in the form of internal threads of a fluid flow aperture 23 of a connector 22, as illustrated in FIG. 2. The larger diameter section 20 of the male nut 16 serves as a knob to facilitate turning the nut to screw the nut in or out of the connector 22. The knob section 20 includes a plurality of longitudinal grooves defined circumferentially around its outer periphery to facilitate gripping the knob between the thumb and a finger of a person's hand.

The recess 23 of the connector 22 includes a cylindrical sidewall 25 defining the internal threads of the connector 22 and a bottom face or wall 38 oriented orthogonally relative to the longitudinal axis of the connector 22 in which is centrally formed a fluid outlet port 27. The bottom wall 38 is oriented orthogonally relative to a central axis of the recess 23.

The male nut 16 includes a passage extending along the longitudinal axis of the nut for receiving the micro-tubing 12. The passage has an inner diameter corresponding closely to the outer diameter of the micro-tubing 12, but being slightly larger so that the tubing easily slides through the passage.

The fitting assembly 10 additionally includes a sleeve or insert 24 having an annular head 26. The annular head 26 is cylindrical, having an outer diameter that is too large to fit within the passage defined through the male nut 16. A circular opening 28 is centrally defined in the distal side of the annular head 26, which leads to a passage 29 extending axially through the insert 24. As used herein throughout, "distal" refers to the side of an object closest to the connector 22, while "proximal" refers to the opposite side.

A cylindrical, elongated tubular neck or stem 30 axially projects from the proximal side of the annular head 26 for insertion into the end of the micro-tubing 12. The stem 30 has an outer diameter approximately equal to, or slightly larger than the inner diameter of the micro-tubing 12 for a sliding force fit within the end of the tubing. The stem 30 is hollow such that the passage 29 extends fully through the insert 24 to permit fluid flow between the micro-tubing 12 and the connector outlet tube 27. The passage 29 is outwardly sealed at the proximal and distal ends of the passage to reduce turbulence in fluid flowing into and out of the passage 29.

When the stem 30 is fully inserted into the end of the micro-tubing 12, the proximal side of the annular head 26 abuts the tubing 12 and prevents further insertion of the stem 30. The interference fit of the stem 30 within the end of the micro-tubing 12 normally causes the end of the tubing to be expanded slightly in diameter. The passage through the male nut 16 for receiving the micro-tubing 12 has a diameter sized large enough to still freely slide over the end of the tubing even when the stem 30 has been inserted into the end of the tubing.

The annular head 26 includes a cylindrical nose section 31 extending from the distal side of the annular head 26 opposite the stem 30. The distal end of the nose section 31 includes a circumferential lip 33, which extends radially outward from around the outer circumference of the end of the distal nose section 31. The outside diameter of the head 26 is greater than the outside diameter of the lip 33. The lip 33 has an outside diameter greater than that of the nose section 31. An annular grove is thus defined by the nose section 31 between the lip 33 and the head 26.

An annular seal 40 having an outer diameter approximately equal to the diameter of the annular head 26, slides over and coaxially surrounds the nose section 31. More particularly, the annular seal 40 includes a central, circular passage. The central passage in the seal 40 includes an internal shoulder dividing the passage into first and second sections of different internal diameters. The first section has an internal diameter approximately equal to the outer diameter of the circumferential lip 33 of the nose section 31, and a length (measured axially) slightly greater than the axial length of the lip 33. The central passage abruptly narrows at the shoulder in the seal 40 to the second passage section. The second passage section has an internal diameter approximately equal to the external diameter of the portion of the nose section 31 of the insert 24 between the lip 33 and head 26. The second passage section has an axial length approximately equal to the axial length of this portion of the nose section 31. When the seal 40 is installed on the nose section 31, the seal's wider, first passage section coaxially and snugly surrounds the circumferential lip 33 and the narrower, second passage section coaxially and snugly surrounds the portion of the nose section up to the circumferential lip. The lip 33 of the insert 24 ensures that the seal 40 is retained on the insert 24 during mating and mating.

The proximal end of the annular seal 40 opposite the seal's first passage section has a flat face that seats against the annular head 26 of the insert 24. The distal end of the annular seal 40 forms a rounded edge projecting axially slightly past the distal end of the nose section 31. Preferably, the annular seal 40 is formed of an elastomeric material resistant to corrosive materials and solvents, such as VITON™ fluorocarbon rubber.

The fitting assembly 10 includes a ferrule 32 having a passage defined axially through the ferrule. This passage includes sections of two different diameters. The proximal or rear passage section has an internal diameter approximately equal or slightly less than the outer diameter of the micro-tubing 12 after the stem 30 is inserted. The rear passage section receives the end of the tubing 12, extending part way along the length of the stem 30 of the insert 24. This section extends to an internal shoulder in the ferrule 32, where the passage abruptly expands to a larger diameter forward passage section. This larger diameter passage section has an internal diameter approximately equal to the outside diameter of the annular head of the insert 24. As explained in the following paragraphs, the larger diameter section of the ferrule 32 slidably receives and surrounds the annular head 26 of the insert 24 and the seal 40. The rounded distal end of the seal 40 projects axially beyond the distal end of the ferrule 32.

Specifically, the ferrule 32 includes an exterior, cylindrical distal (forward) section 34 and a frusto-conical rear section 36. The rear section 36 tapers proximally to a smaller diameter end. When used in the fitting assembly, the ferrule 32 slides over the end of the micro-tubing 12, rear section 36 first, before the stem 30 of the insert 24 is inserted into the end of the tubing 12. Thereafter, the stem 30 inserts into the end of the tubing 12. In this arrangement, the nose section 18 of the male nut 16 abuts the rear section 36 of the ferrule 32. The passage through the male nut 16 is beveled outwardly at the distal end of the passage, and partially receives the tapered smaller diameter end of the rear section 36 of the ferrule 32.

When the nose section 18 of the male nut 16 threadably couples with the connector 22, the nose section 18 presses against the ferrule 32. This causes the ferrule 32 to slide over the micro-tubing 12 and the stem 30 of the insert 24. The smaller passage section in the ferrule 32 has a diameter predetermined to accommodate the slight expansion of the micro-tubing 12 due to insertion of the stem 30. The ferrule 32 slides along the tubing 12 until the larger diameter passage in the ferrule receives the annular head 26 of the insert 24. The annular head 26 slides into the ferrule 32 until the head abuts the internal shoulder in the female and prevents further sliding of the ferrule relative to the tubing 12.

The abutment of the internal shoulder in the female 32 against the annular head 26 causes the nose section 31 of the insert 24 to press against the opposing, substantially orthogonal bottom wall 38 surrounding the fluid outlet port 27 in the connector 22. Specifically, the circumferential lip 33 of the nose section 31 presses against the bottom wall 38 for forming a seal circumferentially surrounding the fluid outlet port 27. This arrangement forms a seal having substantially no dead volume. Because the length of the ferrule 32 is less than the length of the nose of the stem 30, the stem will always bottom first.

Additionally, the annular head 26 of the insert presses against the annular seal 40 and compresses the annular seal against the orthogonal bottom wall 38 of the mating connector 22. The annular seal 40 is preferably formed of an elastomeric material, which deforms to accommodate any irregularities in the bottom wall 38 of the connector 22. The distal end of the ferrule 32 and the lip 33 of the insert 24 also abut the orthogonal bottom wall 38 and surround the annular seal 40. The abutment of the insert 24 against the orthogonal bottom wall 38 of the connector 22 assures a zero dead volume connection which is of primary significance for analytical instrument applications. This limits radial expansion or extrusion of the seal 40 and helps to ensure the seal 40 compressively seals against the bottom wall 38 in the connector 22.

The fitting assembly 10 also seals against the tubing 12. The tubing 12 is initially "pinched" between the ferrule 32 and the stem 30 before connection with the mating connector. The tapered rear section 36 of the ferrule 32 nests within the beveled distal end of the nose section 18 of the male nut 16. When the nose section 18 of the male nut 16 presses against the ferrule 32, the nesting arrangement causes compression of the tapered rear section 36 of the ferrule. This causes the ferrule 32 to compress the tubing 12 against the stem 30 of the insert 24, to form a seal between the insert 24 and the tubing 12.

With the exception of the annular seal 40, the components of the fitting assembly 10 are all preferably formed from a thermoplastic polymer material resistant to corrosive materials and solvents. Suitable materials include polyphenylene sulfide (PPS) for the insert 24 and polyetherether ketone (PEEK) or PPS for the ferrule 32, which is not typically exposed directly to the fluid being analyzed.

The passages through the fitting assembly 10 and the micro-tubing 12 coaxially align with one another to minimize dead volume and any restrictions that would introduce turbulence into a fluid flowing through the tubing. The inside surface of the proximal and distal ends of the insert 24 are also tapered to reduce induced turbulence.

The fitting assembly 10 also permits mating of the micro-tubing 12 to a connector in a substantially leak-proof manner without the use of tools. Specifically, the knob 20 on the male nut 16 provides sufficient leverage such that the threadable coupling between the male nut 16 and the connector 22 need only be made "finger-tight" to substantially prevent leaks. The finger-tight coupling similarly eliminates the need for tools when disconnecting the fitting assembly 10 from the connector 22.

FIG. 3 illustrates an enlarged perspective view of an alternate embodiment of a fitting assembly 110 in accordance with the present invention. The fitting assembly 110 mounts to the end of a length of polymer micro-tubing 12 for mating the end of the tubing to a connector 22 in a leak-proof manner as shown in FIG. 4.

The fitting assembly 110 includes a male nut 16 as described in connection with the previous embodiment. The other components of the fitting assembly 110 are preferably made of the same material as corresponding components of the previously described embodiment, but have structural differences.

Specifically, the fitting assembly 110 includes a different sleeve or insert 124. The insert 124 includes an annular head 126 that does not included a nose section as in the previously described embodiment. Instead, the annular head 126 includes an annular recess or channel formed in the distal (forward) side of the head which receives an annular seal 140, such as an O-ring. The channel and seal 140 encircle an opening 128 that is centrally defined in the distal side of the annular head 126 that leads to a passage extending axially through the insert 124. The channel and seal 140 encircle the opening 128 a spaced distance away from the outer periphery of the opening. Thus, the annular seal 140 encircles a circular band 142 of the annular head 126. The circular band 142 in turn encircles the opening 128 in the distal side of the annular head 126.

In other respects, the insert 124 has many similarities to the insert 24 of the previously described embodiment. In this regard, the annular head 126 is cylindrical and has an outer diameter too large to fit within the passage defined through the male nut 16. A cylindrical, elongated tubular neck or stem 130 axially projects from the proximal side of the annular head 126 for insertion into the end of the micro-tubing 12 as in the previously described embodiment. The stem 130 inserts into the micro-tubing 12 until the end of the tubing abuts the annular head 126 of the insert 124.

The fitting assembly 110 additionally includes a ferrule 132 different from the ferrule 32 in the previously described embodiment. Specifically, the ferrule 132 has an internal passage that does not include an internal shoulder, i.e., the passage has a uniform internal diameter. The internal passage in the ferrule 132 approximately equals the outer diameter of the micro-tubing 12. As explained in the following paragraphs, the ferrule 132 is slid over the end of the micro-tubing 12 before the stem 130 of the insert 124 is inserted into the end of the tubing 12. The inner diameter of the ferrule 132 is predetermined to accommodate the slight expansion of the tubing 12 caused by insertion of the stem 130.

The ferrule 132 has a generally cylindrical distal (forward) section 134. The cylindrical section 134 has an outer diameter slightly smaller than the outer diameter of the annular head 126 of the insert 124, but which is too large to fit within the passage through the male nut 16. The ferrule 132 additionally includes a frusto-conical rear section 136 opposite the forward section 134, which tapers proximally to a smaller diameter end.

In use, the ferrule 132 mounts on the end of the micro-tubing 12 between the male nut 16 and the annular head 126 of the insert 124. In this arrangement, the nose section 18 of the male nut 16 abuts the rear section 136 of the ferrule 132. The beveled countersink at the end of the nose section 18 of the male nut 16 partially receives the tapered smaller diameter end of the rear section 136 of the ferrule 132.

When the nose section 18 of the male nut 16 threadably couples with the connector 22, the nose section 18 presses against the ferrule 132. This causes the ferrule 132 to slide over the micro-tubing 12 until the ferrule bears against the annular head 126 of the insert 124. This causes compression of the tapered section 136 of the ferrule 132 against the tubing 12. The tubing 12 is thus compressed between and sealed against the stem 130 and the ferrule 132 as in the previously described embodiment. The force on the female 132 also drives the distal side of the annular head 126 of the insert 124 against the opposing, substantially orthogonal bottom wall 38 surrounding the fluid outlet port 27 in the connector 22. This causes the circular band 142 of the annular head 126 to abut the bottom wall 38 and form a seal surrounding the fluid outlet port 27.

Additionally, the annular seal 140 is compressed and seals against the bottom wall 38 of the mating connector 22. The annular seal 140 thus forms a seal surrounding the circular band 142 of the annular head 126. In this regard, the elastomeric material forming the annular seal 140 reversibly deforms to accommodate irregularities in the bottom wall 38. The channel in the annular head 126 surrounds the annular seal 140 and limits radial expansion of the seal. This helps to ensure the seal 140 compressively seals against the bottom wall 38 in the connector 22.

Figure 5:
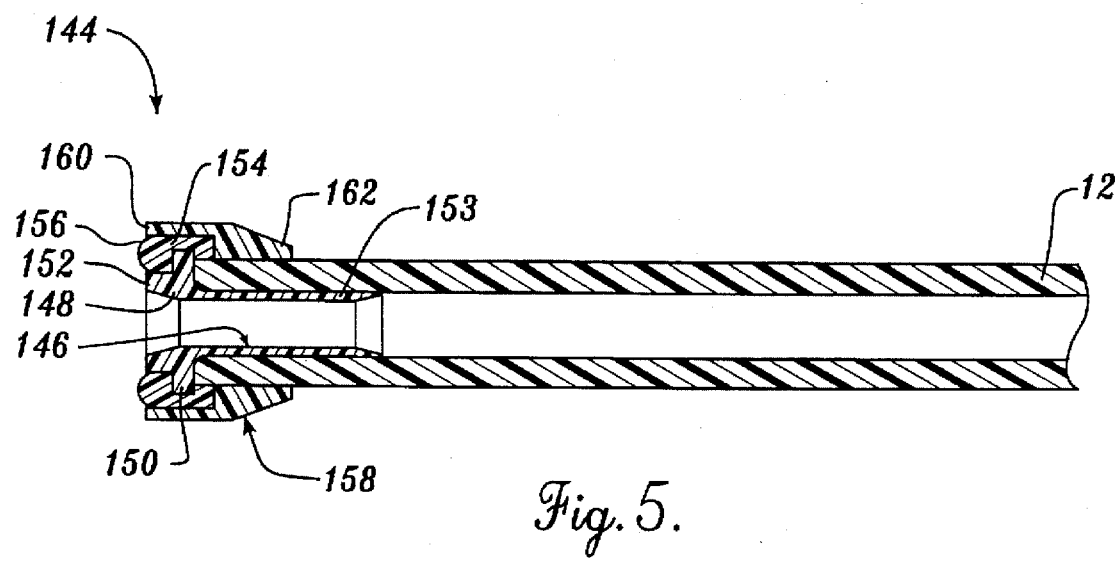
FIG. 5 illustrates a cross-sectional view of an another alternate embodiment of a fitting assembly in accordance with the present invention, connected to a length of polymer micro-tubing, taken through the longitudinal axis of the fitting assembly.

FIG. 5 illustrates yet another alternate embodiment of a fitting assembly 144 in accordance with the present invention. The fitting assembly 144 mounts to the end of a length of polymer micro-tubing 12 for mating the end of the tubing to a connector in a substantially leak-proof manner, such as connector 22 shown in FIGS. 2 and 4.

The fitting assembly 144 includes a male nut (not shown in FIG. 5) substantially identical to the male nut 16 of the previously described embodiments, shown in FIGS. 1–4. The other components of the fitting assembly 144 are preferably made of the same material as corresponding components of the previously described embodiments, but with structural differences. In particular, the fitting assembly 144 of FIG. 5 includes a different sleeve or insert 146.

The different insert 146 includes a cylindrical annular head 148 that has an annular recess defined around its distal (forward) outer edge. The head thus includes a radially projecting outer rim or flange 150 around an axial forward projecting nose 152. A cylindrical, elongated neck or stem 153 projects from the rear side of the annular head 148, substantially identical to the stems 30 and 130 of the previously described embodiments, for insertion into the end of the micro-tubing 12. A passage defined axially through the insert 146 may thus receive and transmit fluid from and to the micro-tubing 12. The stem 153 inserts into the micro-tubing 12 until the end of the tubing abuts the rear side of the flange 150 of the insert 146. The flange 150 preferably has an outer diameter slightly greater than the outer diameter of the micro-tubing 12 as installed over the stem 153.

The fitting assembly 144 additionally includes a different annular seal 154 for surrounding the annular head 148. Viewed from the exterior, the annular seal 154 forms a generally tubular shape having a rounded distal (forward) edge 156. A passage is defined generally axially through the seal 154. An annular channel is defined coaxially within the inner wall of the seal 154, at approximately the mid-length of the seal 154. The channel provides an internal profile for the seal 154 that is complementary to the outer profile of the flange 150 of the annular head 148.

When the seal 154 surrounds the annular head 148, the flange 150 of the annular head 148 snugly fits within the interior channel defined in the seal. In this configuration, the inner periphery of the rounded forward edge 156 of the seal 154 snugly surrounds the nose 152 of the annular head 148 and abuts the forward side of the flange 150. The rounded annular forward side of the seal 154 projects distally beyond the distal (forward) side of the nose 152 of the insert 146. The inner periphery of the rear of the seal 154 snugly contacts and surrounds the outer periphery of the end of the micro-tubing 12 and abuts the rear (proximal) side of the flange 150.

The nose 152 of the annular head 148 preferably has an outer diameter slightly less than the outer diameter of the micro-tubing 12 as installed over the stem 153. The inner wall of the seal 154 on either side of the channel is correspondingly contoured to these diameters.

Finally, the fitting assembly 144 of FIG. 5 includes a ferrule 158 having a forward section 160 and a rear section 162. The forward section 160 is generally cylindrical, while the rear section 162 is generally frusto-conical in shape. The forward section 160 integrally extends from the larger diameter end of the frusto-conical rear section 162, substantially along the central axis of both sections. A substantially axial passage extends through the forward and rear sections 160 and 162 of the ferrule 158.

Approximately the rear half of the passage has a diameter sized to slidably receive the end of the micro-tubing 12 when the stem 153 of the insert 146 has been inserted into the end of the tubing. At about the mid-length of the passage, the passage defines a shoulder where the passage diameter abruptly increases to a size for slidably receiving the annular seal 154 as installed over the annular head 148 of the insert 146. The distal portion of the forward section 160 of the ferrule 158 thus forms an annular flange which surrounds the seal 154 except for that rounded portion projecting beyond the nose 152, which remains exposed. The forward section 160 of the ferrule 158 thus has an outer diameter greater than the annular seal 154 as installed over the annular head of the insert 146.

The diameter of the forward section 160 of the ferrule 158 is also greater than the diameter of the passage defined through the male nut 16 (see FIGS. 1–4). In use, the ferrule 158 mounts on the end of the micro-tubing 12 between the male nut 16 and the annular head 148 of the insert 146. In this arrangement, the nose section 18 of the male nut 16 abuts the rear section 162 of the ferrule 158. Specifically, the smaller diameter end of the rear section 162 concentrically nests within the countersink in the nose section 18 of the male nut 16.

When the nose section 18 of the male nut 16 threadably couples to the connector 22, the nose section presses against the ferrule 158. This causes the ferrule 158 to slide over the micro-tubing 12 until the shoulder in the ferrule presses against the rear of the annular seal 154. The pressing force drives the internal notch in the annular seal 154 against the flange 150 of the annular head 148 of the insert 146. This pressing force drives the nose 152 of the annular head 148, and the rounded forward edge 156 of the annular seal 154 against the internal wall 38 in the connector 22 (see FIGS. 2 and 4).

The micro-tubing 12 is thus compressed and sealed between the conical portion 162 of the ferrule 158 and the stem 153 of the insert 146. The elastomeric seal 154 is axially compressed between the ferrule 158 and bottom wall 38 of the connector 22. The surrounding forward section 160 of the ferrule 158 limits radial expansion of the seal 154, thus ensuring the seal 154 compressively seals around the flange 150 of the head 148 of the insert 146.

Figure 6:
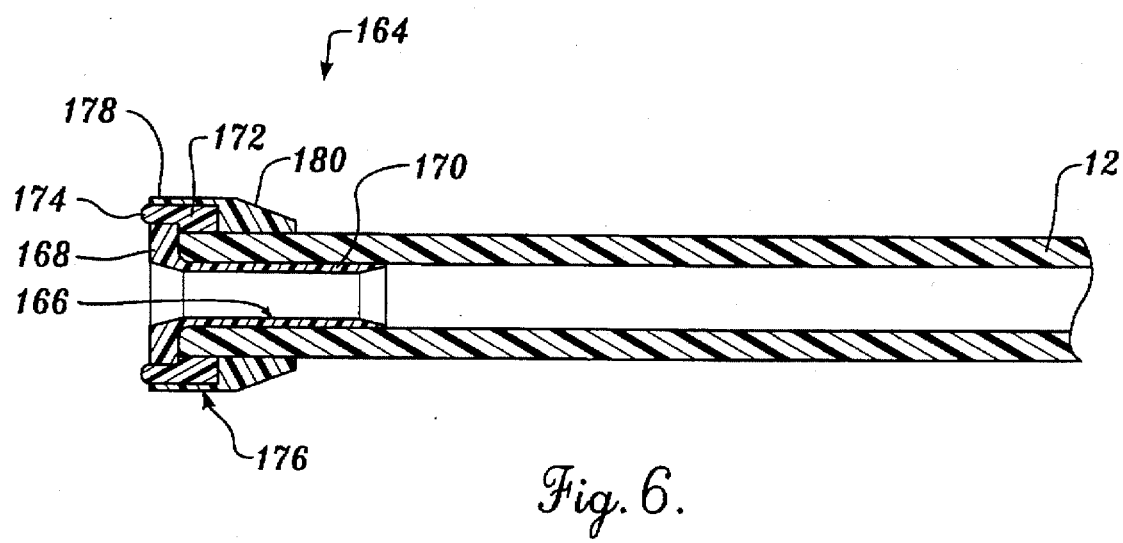
FIG. 6 illustrates a cross-sectional view of yet another alternate embodiment of a fitting assembly in accordance with the present invention, connected to a length of polymer micro-tubing, taken through the longitudinal axis of the fitting assembly.

FIG. 6 illustrates still another alternate embodiment of a fitting assembly 164 in accordance with the present invention. The fitting assembly 164 mounts to the end of a length of polymer micro-tubing 12 for mating the end of the tubing to a connector in a substantially leak-proof manner, such as connector 22 shown in FIGS. 2 and 4.

The fitting assembly 164 includes a male nut (not shown in FIG. 6) substantially identical to the male nut 16 in previously described embodiments. The other components of the fitting assembly 164 are preferably made of the same material as corresponding components in the previously described embodiments, but with structural differences. In particular, the fitting assembly 164 of FIG. 6 includes a different sleeve or insert 166.

The different insert 166 includes a generally cylindrical annular head 168 having an outer diameter too large to fit within the passage defined through the male nut 16. A cylindrical, elongated neck or stem 170 axially projects from the rear side of the annular head 168, substantially identical to the stems in previously described embodiments, for insertion into the end of the micro-tubing 12. A passage defined generally axially through the insert 166 can thus receive and transmit fluid from and to the micro-tubing 12 through the stem 170 inserted into the tubing. The stem 170 inserts into the end of the micro-tubing 12 until the tubing abuts the rear side of the annular head 168 of the insert 166.

The fitting assembly 164 includes an annular seal 172 for surrounding the annular head 168. Viewed from the exterior, the annular seal 172 forms a tubular cylindrical shape having a rounded forward (distal) edge 174. A passage defined generally axially through the seal includes two different diameters. Approximately the rear half of the seal 172 has a diameter sized to closely receive and contact the end of the micro-tubing 12 as installed over the stem 170. At approximately mid-length, the seal 172 defines an internal shoulder where the diameter of the passage abruptly increases. The increased diameter at the internal shoulder slidably accommodates the outer diameter of the annular head 168 of the insert 166. When the annular seal 172 slidably receives the end of the micro-tubing 12 and the annular head 168 of the insert 166, the internal shoulder in the seal presses against the rear side of the annular head. Additionally, the rounded forward edge 174 of the seal 172 projects slightly frontward (distally), past the front side of the annular head 168.

The fitting assembly 164 includes a ferrule 176. The ferrule 176 includes a generally cylindrical forward section 178, and a generally frusto-conical rear section 180. The forward section 178 integrally extends from the larger diameter end of the rear section 180, substantially along the central axis of both sections.

Internally, the ferrule 176 includes a substantially axial passage. Approximately the rear half of the passage has a diameter sized to slidably receive the end of the micro-tubing 12 when the stem 170 of the insert 166 has been inserted into the end of the tubing. At about the mid-length of the passage, the passage defines a shoulder where the passage diameter abruptly increases to a size for slidably receiving the annular seal 172 as installed over the annular head 168 of the insert 166.

The ferrule 176 of the present embodiment, and the ferrule 158 of the last-described embodiment, are similar except as to dimensions. The larger diameter section of the internal passage in the ferrule 176 of the present embodiment is slightly larger than the corresponding section of the internal passage in the ferrule 158 of the last-described embodiment. The outer diameter of the annular seal 172 in the present embodiment necessitates the size difference.

The fitting assembly 164 of the present embodiment employs the ferrule 176 in substantially the same manner as the last-described embodiment. In particular, the ferrule 176 mounts on the end of the micro-tubing 12 between the male nut 16 and the annular head 168 of the insert 166. In this arrangement, the rear section 180 of the ferrule 176 abuts the nose section 18 of the male nut 16.

When the nose section 18 threadably couples to the connector 22, the nose section presses against the female 176. This pressing force drives the shoulder in the ferrule 176 against the annular seal 172. The shoulder in the annular seal 172 in turn presses against the annular head 168 of the insert 166, which presses the annular head against the internal wall 38 in the connector 22 (see FIGS. 2 and 4). The rounded forward edge 174 of the annular seal 172 simultaneously compresses against the internal wall 38, around the outer periphery of the forward side of the annular head 168, as restrained by the surrounding section 178 of the ferrule 176.

While the preferred embodiments of the invention have been illustrated and described, it will be appreciated that various changes can be made therein without departing from the spirit and scope of the invention. For example in some of the embodiments, the ferrule and stem could be formed as a single, integral piece. As a further example, the present invention can be adapted for use with mating microtubing to connectors using engaging surfaces other than threads. Thus, referring to the embodiment of FIGS. 1 and 2, the nut 16 and connector 22 could be provided with interlocking push-to-connect snap-fit (not shown) surfaces rather than threads, or a ¼ mm short thread configuration (not shown), and still fall within the scope of the present invention. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A fitting assembly for mating an end of a micro-tubing segment in fluid communication to a connector having a first interlocking surface and a bottom wall having a fluid outlet port defined centrally therein, the fitting assembly comprising:
   (a) a nut having a second interlocking surface engageable with the first interlocking surface of the connector and having a longitudinal passage for slidably receiving the end of the micro-tubing segment;
   (b) an annular ferrule capable of being slidably received on the received end of the micro-tubing segment;
   (c) a tubular insert having a stem insertable within the received end of the micro-tubing segment and an annular head which abuts the received end of the micro-tubing segment after insertion of the stem, the ferrule being captured between the nut and the head of the insert; and
   (d) an annular elastomeric seal receivable coaxially on the head of the insert and extending distally beyond a distal side of the head of the insert in a direction away from the stem of the insert, the nut bearing on the ferrule when the fitting assembly is mated with the connector to compressively seal the received end of the micro-tubing segment between the ferrule and the stem of the insert and to compress the elastomeric seal in sealing engagement with the head of the insert and the bottom wall of the connector.

2. The fitting assembly of claim 1, wherein the annular head includes a nose section extending from the distal side of the annular head and which receives the annular elastomeric seal.

3. The fitting assembly of claim 2, wherein the nose section includes a lip radially extending from around the periphery of the nose section for retaining the annular elastomeric seal on the nose section of the annular head.

4. The fitting assembly of claim 1, wherein an annular groove is defined in the distal side of the head of the insert, and the elastomeric seal is received within the annular groove.

5. The fitting assembly of claim 1, wherein the head of the insert defines a proximal side opposite the distal side of the head, the stem extending from the proximal side of the head, and further defines an annular circumferential surface between the distal and proximal sides of the head, wherein the elastomeric seal is received around the circumferential surface of the head.

6. The fitting assembly of claim 5, wherein the elastomeric seal includes a first internal circumferential shoulder portion which extends proximally beyond the proximal side of the head of the insert and contacts an outer surface of the received end of the micro-tubing segment.

7. The fitting assembly of claim 6, wherein the ferrule bears against the shoulder of the elastomeric seal when the fitting assembly is connected to the connector.

8. The fitting assembly of claim 7, wherein the ferrule includes an annular flange extending distally from the ferrule and surrounding an outer circumferential surface of the elastomeric seal.

9. The fitting assembly of claim 7, wherein an annular recess is formed around the edge of the distal side of the head of the insert, the elastomeric seal including a second internal circumferential shoulder portion that fills the recess.

10. A fitting assembly for mating an end of a micro-tubing segment in fluid communication to a connector having a first interlocking surface and an internal wall, the fitting assembly comprising:
   (a) a male nut having a second interlocking surface dimensioned for coupling with the first interlocking surface of the connector, wherein a passage is defined axially through the nut for receiving the end of the micro-tubing segment;
   (b) an insert including an elongated tubular stem having opposite ends, and an annular head extending coaxially from one end of the stem, the other end of the stem being insertable within the received end of the polymer micro-tubing segment so that the annular head of the insert abuts an end edge of the received end of the polymer micro-tubing;
   (c) an annular elastomeric seal receivable coaxially in sealing contact with both the annular head of the insert and the internal wall of the connector when the fitting assembly is mated to the connector; and
   (d) an annular ferrule receivable coaxially on the received end of the micro-tubing segment and captured between the annular head of the insert and the nut, so that the nut causes compression of the elastomeric seal when the assembly is mated to the connector.

11. The fitting assembly of claim 10, wherein the annular head includes a nose section extending from the annular head opposite the stem for receiving the annular elastomeric seal.

12. The fitting assembly of claim 10, wherein the ferrule includes an internal passage receiving the annular head when the fitting assembly is mated to the connector.

13. The fitting assembly of claim 10, wherein the annular head of the insert includes a first side proximate the elongated stem, and a second side opposite the first side, the second side having an annular channel defined therein for receiving the annular elastomeric seal.

14. The fitting assembly of claim 13, wherein the ferrule abuts the first side of the head of the insert and the elastomeric seal is compressed between the annular head of the insert and a bottom portion of the internal wall of the connector when the fitting assembly is connected to the connector.

15. The fitting assembly of claim 10, wherein the elastomeric seal circumferentially surrounds the annular head of the insert.

16. The fitting assembly of claim 15, wherein the ferrule bears against the elastomeric seal when the fitting assembly is mated to the connector.

17. The fitting assembly of claim 15, wherein the ferrule includes an annular flange projecting coaxially and longitudinally from the ferrule to circumferentially surround at least a portion of the elastomeric seal.

18. The fitting assembly of claim 15, wherein an annular portion of the elastomeric seal is compressed between the ferrule and the head of the insert.

19. The fitting assembly of claim 15, wherein the annular head of the insert includes an annular first side proximate the elongated stem and an annular second side opposite the first side, and the elastomeric seal includes a first internal circumferential shoulder for abutting the first side of the annular head of the insert.

20. The fitting assembly of claim 19, wherein the first shoulder of the elastomeric seal also seals against an exterior wall of the received end of a micro-tubing segment.

21. The fitting assembly of claim 19, wherein the second side of the head of the insert includes an annular recess extending inward from the perimeter of the head, and the elastomeric seal includes a second internal circumferential shoulder filling the recess.

22. The fitting assembly of claim 10, wherein the elastomeric seal extends longitudinally beyond the head of the insert towards a bottom portion of the internal wall of the connector so as to seal with the bottom portion of the wall when the fitting assembly is mated to the connector.

23. A fitting assembly for mating an end of a micro-tubing segment in fluid communication to a connector having a first interlocking surface and an internal wall, the fitting assembly comprising:

(a) a male nut having a second interlocking surface adapted for coupling with the first interlocking surface of the connector, wherein a passage is defined axially through the nut, the passage being for receiving the end of the micro-tubing segment;

(b) a sleeve including a head section having a first cross-sectional area, and a stem section centrally projecting from the head section and having a second cross-sectional area smaller than the first cross-sectional area, the stem section being inserted into the end of the polymer micro-tubing when the fitting assembly is mated to the connector;

(c) an annular elastomeric seal circumferentially surrounding at least a portion of the head section and abutting the internal wall in the connector when the fitting assembly is mated to the connector; and (d) means for sealing against an exterior surface of the received end of the micro-tubing segment and for compressing the elastomeric seal when the fitting assembly is mated to the connector.

24. The fitting assembly of claim 23, wherein the head section includes a nose section projecting from the head section opposite the stem for receiving and being circumferentially surrounded by the annular elastomeric seal.

25. The fitting assembly of claim 23, wherein the head section includes a first side having an annular channel defined therein, and a second side from which the stem section extends, the elastomeric seal being received within the channel of the first side to face a bottom portion of the internal wall in the connector when the fitting assembly is mated with the connector.

26. The fitting assembly of claim 23, wherein the means for sealing and compressing comprises a ferrule circumferentially surrounding the micro-tubing segment and captured between the head section of the sleeve and the nut when the fitting assembly is mated to the connector.

27. The fitting assembly of claim 26, wherein the ferrule abuts the head section of the sleeve when the fitting assembly is mated to the connector.

28. The fitting assembly of claim 26, wherein the elastomeric seal circumferentially surrounds the outer periphery of the head section of the sleeve when the fitting assembly is mated to the connector.

29. The fitting assembly of claim 28, wherein the elastomeric seal includes an internal shoulder for abutting a side of the head section from which the stem section extends.

30. The fitting assembly of claim 26, wherein the ferrule circumferentially surrounds the elastomeric seal when the fitting assembly is mated to the connector.

* * * * *

UNITED STATES PATENT AND TRADEMARK OFFICE
CERTIFICATE OF CORRECTION

PATENT NO. : 5,669,637
DATED : September 23, 1997
INVENTOR(S) : A.I. Chitty

It is certified that error appears in the above-identified patent and that said Letters Patent is hereby corrected as shown below:

Title page

Item [73] Assignee "Optimize technologies" should read --Optimize Technologies--

Signed and Sealed this

Fifth Day of May, 1998

Attest:

BRUCE LEHMAN

Attesting Officer

Commissioner of Patents and Trademarks